June 20, 1939.  R. MacGREGOR  2,162,917
LIQUID BRAKE AND CARRIER FOR SHIPS' RUDDERS
Filed July 8, 1937   5 Sheets-Sheet 2
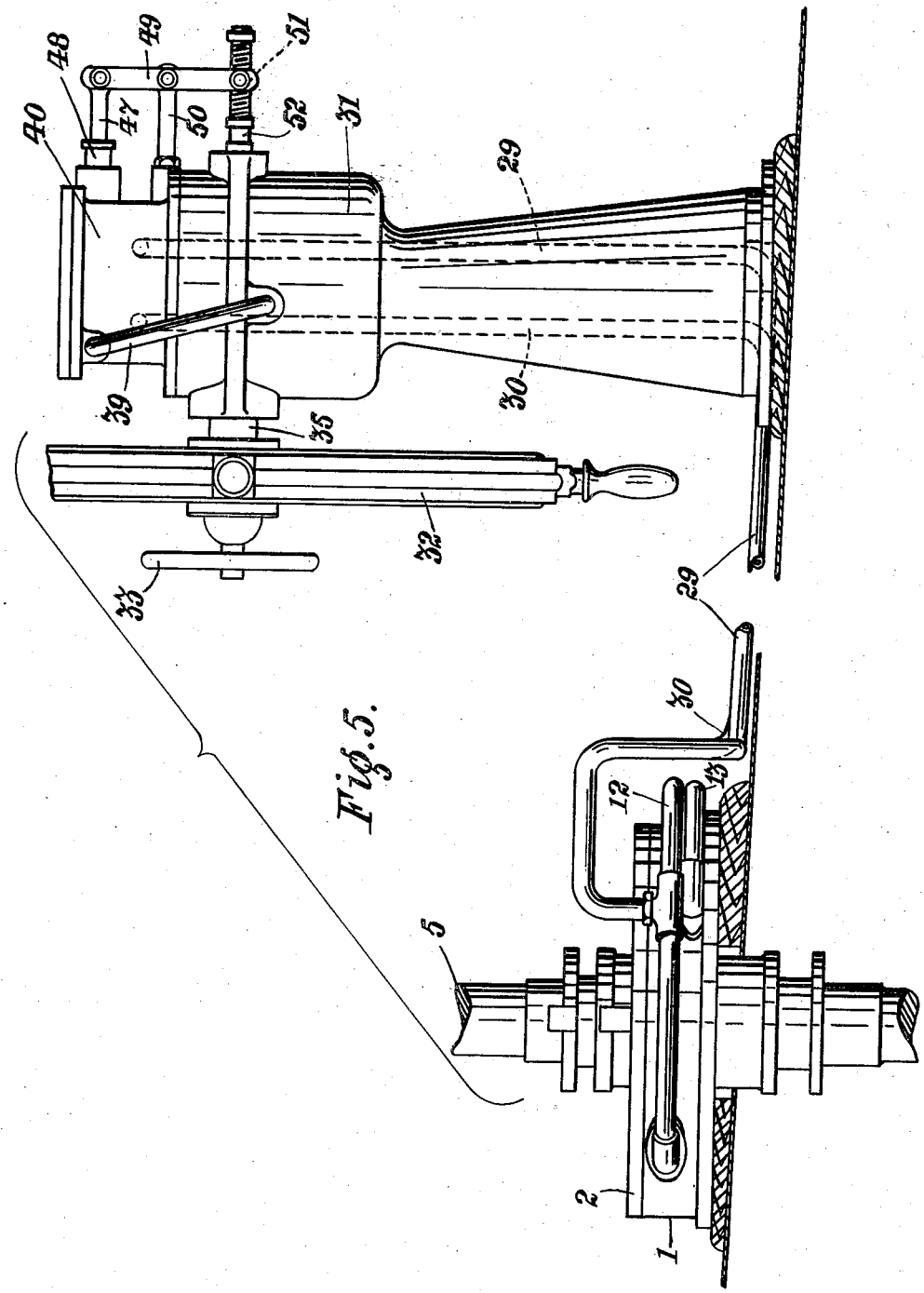
Robert MacGregor
INVENTOR
his ATT'Y.

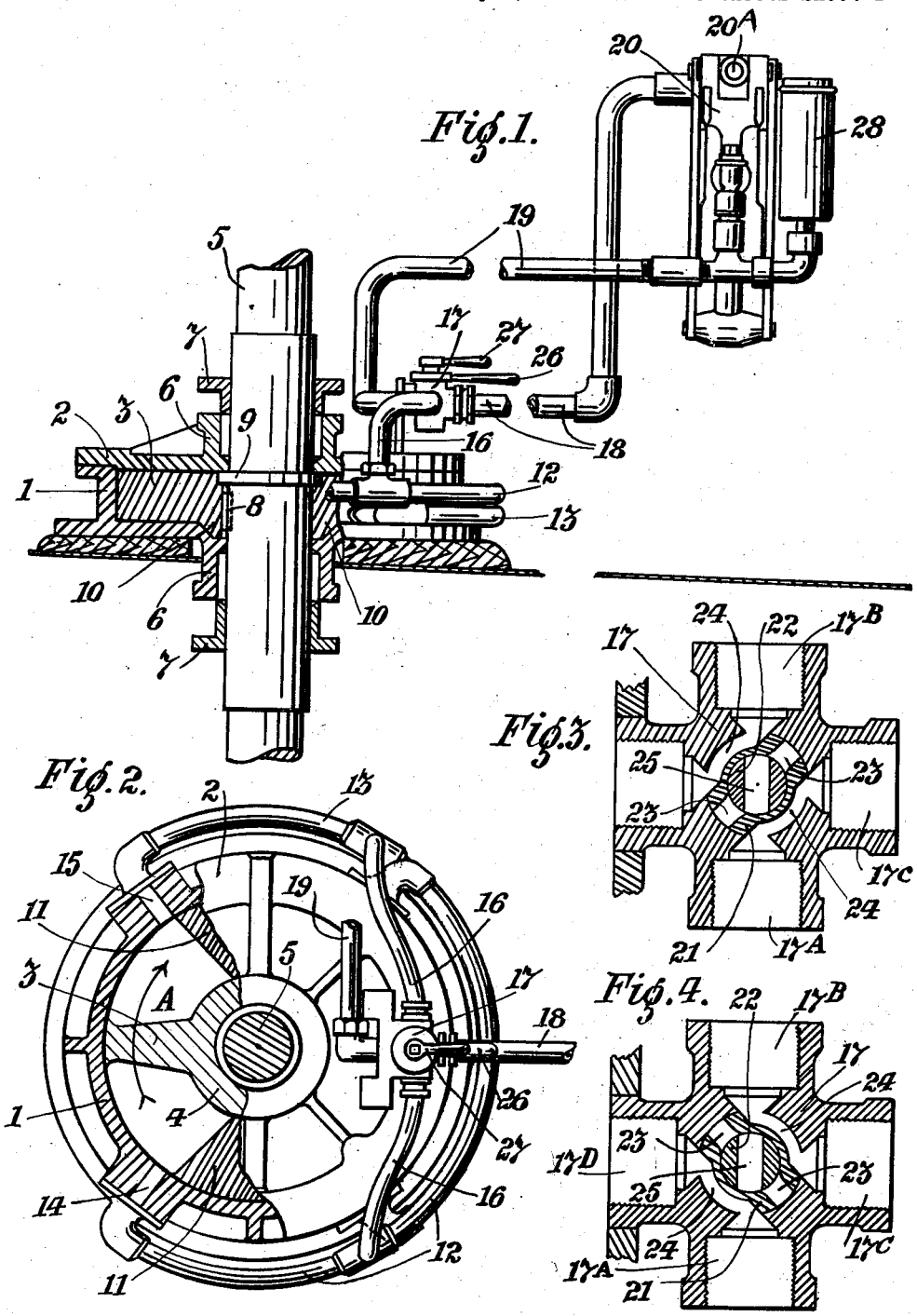

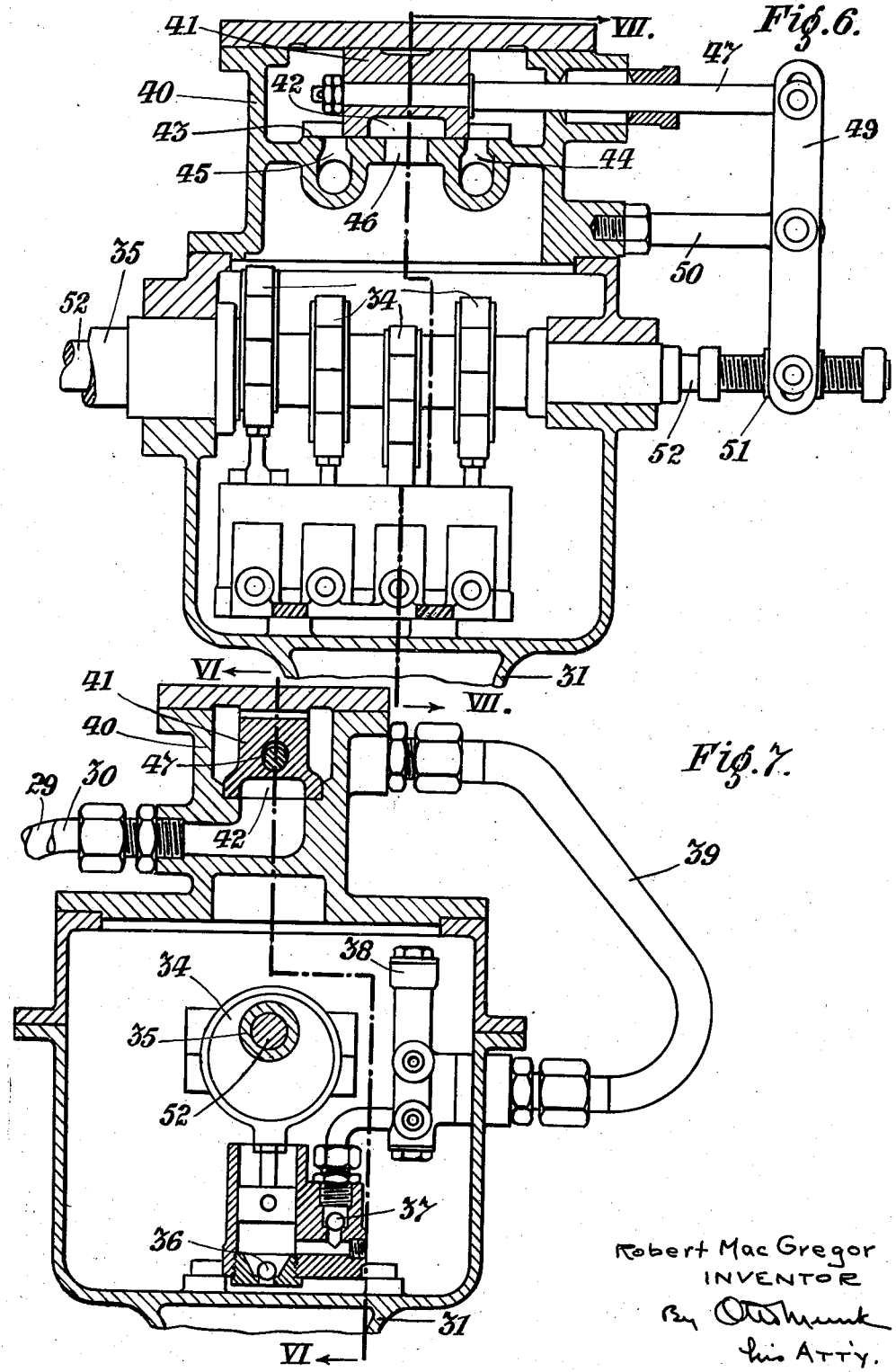

June 20, 1939.  R. MacGREGOR  2,162,917
LIQUID BRAKE AND CARRIER FOR SHIPS' RUDDERS
Filed July 8, 1937  5 Sheets-Sheet 4

Robert MacGregor
INVENTOR
By [signature]
his Att'y.

June 20, 1939.  R. MacGREGOR  2,162,917

LIQUID BRAKE AND CARRIER FOR SHIPS' RUDDERS

Filed July 8, 1937  5 Sheets-Sheet 5

Robert MacGregor
INVENTOR

By [signature]
his ATTY.

Patented June 20, 1939

2,162,917

UNITED STATES PATENT OFFICE 2,162,917

LIQUID BRAKE AND CARRIER FOR SHIPS' RUDDERS

Robert MacGregor, Port-Glasgow, Scotland

Application July 8, 1937, Serial No. 152,603
In Great Britain July 9, 1936

12 Claims. (Cl. 114—171)

This invention relates to an assembly which is used ordinarily to fulfil the double function of a liquid brake and carrier for ships' rudders, said assembly being of the type comprising a liquid-containing casing subdivided into compartments and a vaned rotor which is secured to the rudder stock against axial and angular motion relative to said stock and which is rotatably seated in said casing to bear the down-thrust of said stock; i. e. the thrust due to the weight of the stock and the rudder thereon. The braking action of the assembly serves to minimise and absorb the shocks and serious vibration to which a ship's rudder is subjected.

An object of the present invention is to improve an assembly of the type stated by making provision whereby it can be used not only as a combined carrier and liquid brake, or shock absorber, but whenever required as a combined carrier and steering gear.

Another object is to provide an assembly which will incorporate an auxiliary steering gear and will be capable of conversion for use as such whenever desired, for example in an emergency, in a most simple and expeditious manner.

Another object is to provide an assembly of the type stated comprising also pump connections communicating with the respective compartments of said casing and means for directing liquid to-and-from said compartments in accordance with whether the assembly is to be put to use also as a liquid brake or whether the assembly is to be put to use also as a steering gear. In the former use, the liquid is directed yieldingly to oppose turning of the vaned rotor; whereas in the latter use the liquid is pumped and directed to effect turning of the vaned rotor in one or another direction, namely to port or starboard.

Another object is to enhance the qualities of the assembly as a carrier by providing a conical seating between the casing and the underside of the vaned rotor, such a seating serving also to prevent or minimise leakage of liquid from the casing.

Another object is to provide an assembly including a somewhat restricted by-pass which inter-connects the compartments so that the assembly can be used as a liquid brake, means for closing said by-pass so that the assembly can be used as a steering gear, and control means for directing liquid to-and-from said compartments in accordance with the direction in which the vaned rotor is to be turned when the assembly is used as a steering gear. When such a by-pass is opened, the liquid is free to pass from compartment to compartment; but nevertheless the by-pass imposes a yielding opposition to any rapid passage of liquid and therefore the liquid passes sluggishly and so serves to damp and absorb any surges or shocks imparted from the rudder to the vaned rotor. In other words, the opened by-pass sets up a "dashpot" effect on the vaned rotor.

Another object is to provide in combination with an assembly of the type hereinbefore defined a pump connected to the casing and adapted to be manually operable by a rotatable handwheel made and mounted in a manner to simulate the usual steering wheel of a ship.

Yet another object in an arrangement including a rotatable handwheel as aforesaid is so to contrive a control valve and its operating means that, when the assembly is in use as a steering gear, the steersman follows exactly the same mode of operation as when steering by an ordinary steering wheel.

Other objects of the invention will be apparent from the following description and the following claims.

The invention will now be described by way of example with reference to the accompanying drawings, in which:

Fig. 1 is a sectional elevation of one arrangement of the assembly including also a pump.

Fig. 2 is a sectional plan view of the subdivided casing and parts thereon, shown in Fig. 1.

Figs. 3 and 4 are sectional plan views showing, in different operative positions, a combined distributing and by-pass cock, shown in Figs. 1 and 2.

Fig. 5 is an elevation of another arrangement of the assembly, the pump being incorporated in a steering column.

Fig. 6 is a sectional elevation, to a larger scale, of the head of the steering column shown in Fig. 5, the section being approximately on the line VI—VI of Fig. 7.

Fig. 7 is a sectional elevation, the section being approximately on the line VII—VII of Fig. 6.

Figure 8:
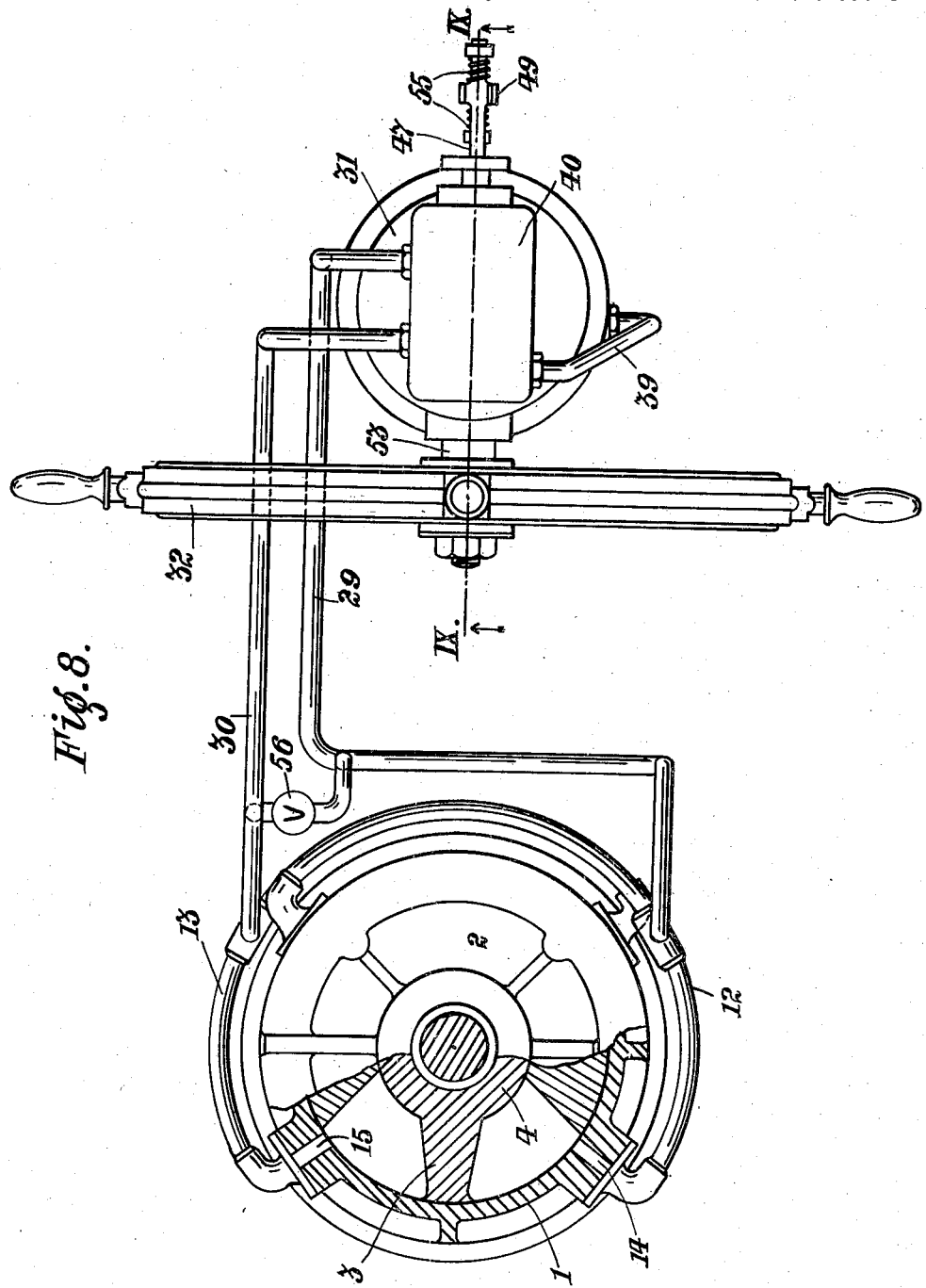
Fig. 8 is a sectional plan of yet another arrangement of the assembly, this arrangement including automatic means for directing the flow of liquid to-and-from the casing when the assembly is used as a steering gear.

Referring to Figs. 1 and 2, the assembly comprises a cylindrical casing 1 and cover 2 within which casing is contained a closely fitting rotor consisting of two diametrally disposed vanes 3 formed with a central boss 4. The rudder stock 5 passes through stuffing boxes 6, which are fitted with glands 7 (shown withdrawn), and also through the boss 4 of the rotor, being secured to the latter against relative angular motion by parallel-sided feathers 8. The rudder stock is formed with a collar 9 which bears within a recess at the top of the boss 4 and thus prevents axially downward movement of the rudder stock relative to the rotor. The rotor is seated on the casing bottom. The bottom of the boss 4 forms a conical thrust bearing 10 which engages a corresponding conical bearing face in the casing bottom and serves to seal the interior of the casing against radially inward leakage of the liquid (usually oil) contained in the casing.

Two radial partitions 11, fitted in the casing 1 and borne against by the central boss 4 of the rotor, subdivide the casing into two diametrally opposite compartments within each of which one of the vanes 3 is disposed.

Two pipes 12 and 13, arranged externally of the casing 1, respectively inter-connect two pairs of ports 14 and 15 in the side of the casing. There is one pair of these ports for each compartment, and only one pair of these ports is shown (Fig. 2). It will be seen that the ports are arranged at opposite angular limits of the respective compartment and adjacent to the radial partitions 11. A by-pass pipe 16, on which is mounted a combined distributing and by-pass cock 17, connects the pipes 12 and 13. The cock 17 has four ways 17A, 17B, 17C and 17D (shown in Figs. 3 and 4), the ways 17A and 17B being connected to the pipe 16 and the ways 17C and 17D being respectively connected to the delivery pipe 18 and suction pipe 19 of a power-driven or hand-driven pump 20, conventionally represented as a hand pump. The pump shown has a socket 20A to receive a hand bar (not shown) which is forced up and down to operate the pump in known manner.

The cock 17 is fitted with two independently turnable plugs 21 and 22, the latter being arranged coaxially within the former. The plug 21 has two diametrally disposed ports 23 and two part-annular ports 24, whilst the plug 22 has a single diametral port 25. The plugs 21 and 22 are respectively operable by handles 26 and 27.

In operation, when the handles 26, 27 are turned so that their respective ports 23 and 25 are in line with the ways 17A and 17B, liquid in the casing 1 will be by-passed between the pipes 12 and 13, so that the assembly will be set to function as a liquid brake.

When the assembly is required for use as a steering gear, the handle 26 is turned so that the plug 21 of the cock is either in the position shown in Fig. 3 or in the position shown in Fig. 4, according as the rudder stock 5 is to be turned to port or to starboard. In Fig. 3, the ways 17C and 17A and the ways 17B and 17D of the cock are respectively connected by the ports 24 of the plug 21, so that when the pump 20 is operated liquid under pressure is delivered to the pipe 12 and thence to the appropriate sides of the vanes 3, turning the latter (with the rudder stock) to port; i. e. in the direction indicated by arrow A in Fig. 2. The liquid expelled by the vanes 3 from the other sides thereof is returned through the pipe 13 to the pump suction. In Fig. 4, the ways 17C and 17B and the ways 17A and 17D are respectively connected by the ports 24 of the plug 21. Thus, when the pump 20 is operated, liquid under pressure is delivered to the pipe 13 and thence to the sides of the vanes 3 which turn the latter to starboard, the liquid expelled from the other sides of the vanes being returned through the pipe 13 to the pump suction.

Further, the handle 26 can be turned to position the plug 21 so as to retain the rotor 3, 4, and hence the rudder stock 5, in fixed position, by preventing flow of liquid from side to side of the vanes 3. This effect can be attained, for example, by turning the handle 26 so that the ports 23 of the plug 21 are in line with the ways 17C and 17D and passage between these ways is closed.

A lock or clip (not shown) may be provided on the handles 26 and 27 to attach them together so that the plugs 21 and 22 can be operated together as a unit with the ports 23 and 25 substantially at right angles to each other. Such a lock would prevent the by-pass from being accidentally opened when the apparatus is operating as a steering gear.

A different lock (not shown) may be provided on or in association with the handle 26 to lock it against rotation when the plug 21 occupies the before-described position in which the rudder stock is retained in fixed position.

Notwithstanding the provision of the conical thrust bearing 10, should any working liquid leak from the casing, such liquid will be replaced from a liquid reservoir 28 associated with the pump 20.

In the arrangement according to Fig. 5, the pipes 12 and 13 of the assembly are connected respectively by pipes 29 and 30 to a pump which is incorporated in a steering column 31 located at any convenient position on the ship. The pump is operable by means of a rotatable steering wheel 32 thereon. Valve mechanism associated with the pump in place of the distributing and by-pass cock 17 in the arrangement according to Figs. 1 to 4 is operated by a control hand-wheel 33. The pump, as shown in Figs. 6 and 7, is a four-throw (or four cylinder) pump contained within the head of the steering column, which is formed as a liquid reservoir. This pump includes as its driving means eccentrics 34 on a hollow shaft 35 to which the steering wheel 32 is also attached. The suction valves 36 and discharge valves 37 of the pump are of the ball type, the suction valves being open to the liquid reservoir and the discharge valves being connected through a pressure relief valve 38 and a pipe 39 to a valve chamber 40 to which the pipes 29 and 30 are connected. A valve 41 having a central port 42 is slidably mounted on a face 43 which has two ports 44 and 45, respectively in connection with the pipes 29 and 30, and also a third central port 46.

The valve-rod 47 is connected by a lever 49, fulcrumed on a support 50, to a nut 51 which engages a screw-threaded shaft 52, sleeved by and rotatable in the shaft 35. The hand-wheel 33 is attached to the shaft 52.

To operate the apparatus as a steering gear, the hand-wheel 33 is turned say in the direction which results in the rudder stock 5 being turned to port. This moves the valve 41 to the left (as viewed in Fig. 6) through the medium of the lever 49, thus uncovering the port 44 and causing the ports 45 and 46 to be inter-connected by the central port 42. When the steering wheel 32 is turned, liquid is pumped through the port 44 and pipe 29 to the casing 1, causing the rudder stock to be turned to port, and the liquid expelled by the vanes is returned through the pipe 30 and ports 45, 42 and 46 to the liquid reservoir.

Similarly, when instead the hand wheel 33 is turned in the opposite direction, the valve 41 is moved to the right, the port 45 is uncovered and ports 44 and 46 are inter-connected. When the steering wheel is turned, liquid is pumped to the casing 1 through the pipe 30, causing the rudder stock to be turned to starboard, and liquid is returned to the reservoir through the pipe 29 and ports 44, 42 and 46.

When however the hand wheel occupies its mid-position (as shown in Fig. 6) both ports 44 and 45 are uncovered, and so liquid will be by-passed through the valve chamber 40. Thus, the assembly will be set to perform its normal function as a liquid brake.

Figure 9:
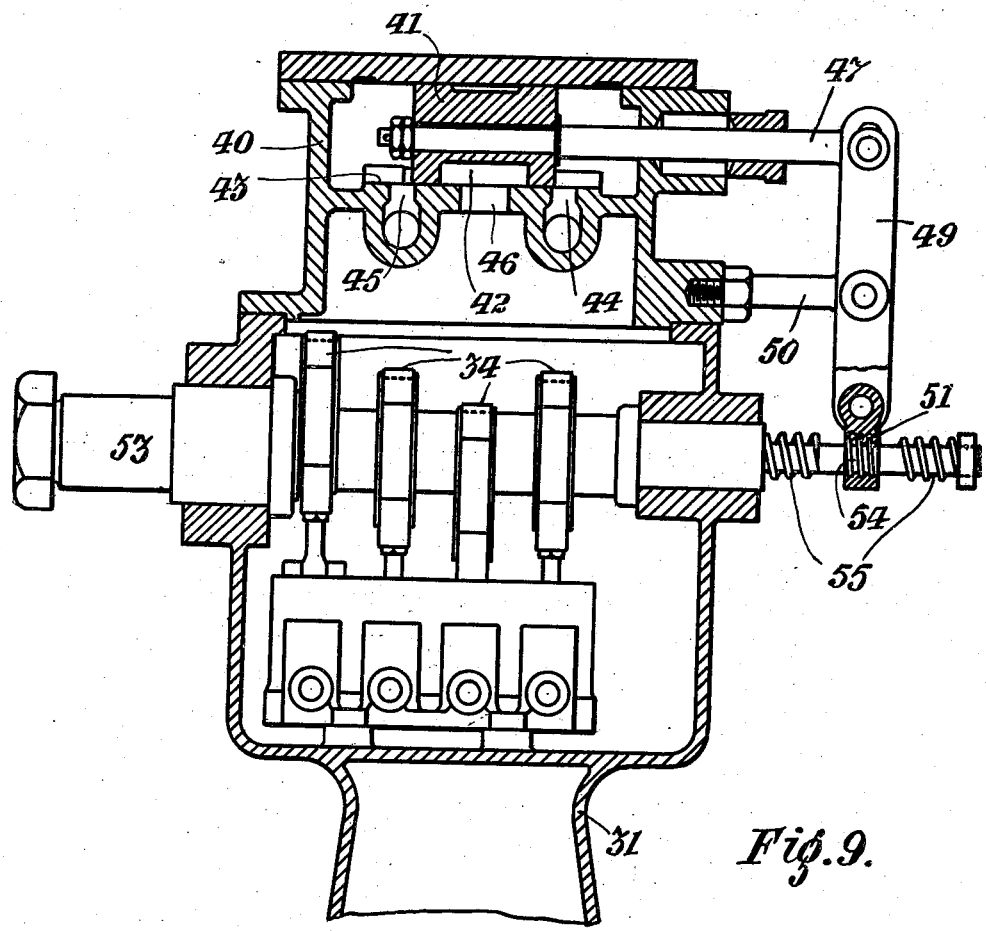
Fig. 9 is a partial sectional elevation, to a larger scale, of parts supported by the head of the steering column shown in Fig. 8, the section being on the line IX—IX of Fig. 8.

In the arrangement shown in Fig. 8 and 9, when the assembly is converted for use as a combined carrier and steering gear, operation of the steering wheel 32 in the manner in which a ship's steering wheel is usually operated causes the assembly automatically to turn the rudder stock in the required direction and to the desired extent.

The steering wheel 32 (omitted from Fig. 9 for clearness) is connected to a pump shaft 53 which has an end part having a short screw threaded portion 54 and two surrounding helical springs 55. The portion 54 constitutes an operative component of the pump shaft and the nut 51 constitutes a complementary component of the valve displacing means including also the lever 49.

Parts corresponding to parts of the arrangement according to Figs. 5 to 7 are again denoted by the same reference numerals.

When the steering wheel is turned to port, the screw-threaded portion 54 forces the lever 49 to move the valve 41 to the left into its port position; and when this position is reached the nut 51 leaves the screw thread. By continuing to turn the steering wheel, the steersman pumps liquid to the casing and thus keeps turning the rudder stock to port without affecting the position of the valve 41.

When, however the steering wheel is turned to starboard, the appropriate spring 55 causes the nut 51 to re-engage the screw-thread, and so the valve 41 is moved to the right towards its starboard position, where it remains whilst the steering wheel is being further turned to starboard and liquid is thus being pumped to the casing 1 in order to return it towards its mid-position or to turn it beyond said position to starboard.

As previously, the valve remains in its starboard position until the steering wheel is again turned to port. Thus, the steersman acts precisely as when using the usual steering wheel, and he requires no special instruction as to the mode of operating the gear shown.

As in the former arrangement, when the valve 41 is set in its central position, the apparatus functions as a brake.

Where a steering column such as in either of the arrangements according to Figs. 5 to 9 is located at a material distance from the casing 1, a separate by-pass valve 56 (shown only in Fig. 8) is preferably fitted between the pipes 29 and 30 adjacent to the casing 1, or if desired corresponding by-pass cocks may be mounted on the casing to control by-pass passages through the division members 11. This arrangement obviates any considerable frictional resistance to flow of the fluid which would otherwise occur if the liquid had to circulate through the pipes leading to and from the valve 41.

Figure 10:
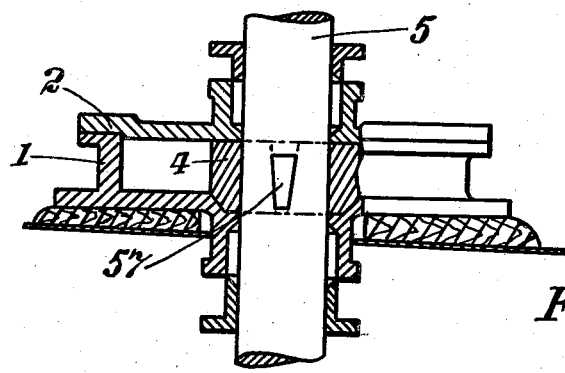
Fig. 10 is a sectional elevation showing an alternative form of attachment of the rudder stock to the vaned rotor of the assembly.

In any of the arrangements described, one or more tapered keys 57, as shown in Fig. 10, may be used, preferably in smaller apparataus, to take the down-thrust of the rudder stock 5 (instead of the parallel-sided feathers 8 and collar 9 shown in Fig. 1) and secure the boss 4 of the rotor to the rudder stock. Such a key or keys serves or serve the dual function of preventing both axial and angular movement of the rotor relatively to the rudder stock.

I claim:

1. A ship's-rudder carrier including rudder-turning means, a pump, conduits for the passage of liquid between the carrier and pump, a manually rotatable wheel operatively connected to the pump, a displaceable valve in said conduits for directing liquid from the pump to the carrier in order to turn the rudder-turning means in a desired direction, a rotatable screwed member connected to said rotatable wheel for rotation thereby, an axially displaceable screwed member to actuate said valve, said screwed members being adapted to engage and disengage each other, and spring means for bringing the screwed members into engagement, the screwed members coacting to displace said valve according to the direction in which the wheel is rotated.

2. A ship's rudder-carrying assembly comprising a liquid-container subdivided into compartments, a rudder stock passing into said container, rudder-turning rotatable means seated in said container to bear the down-thrust of said stock, means securing said rotatable means to said stock against relative axial and angular motion, a steering pedestal, a pump, conduits for the passage of liquid between said compartments and said pump, a manually rotatable wheel journalled on said steering pedestal and operatively connected to the pump, a displaceable valve in said conduits for directing liquid from the pump to said compartments in order to turn said rudder-turning rotatable means in a desired direction, a rotatable screwed member connected to said rotatable wheel for rotation thereby, an axially displaceable screwed member to actuate said valve, said screwed members being adapted to engage and disengage each other, and spring means for bringing the screwed members into engagement, the screwed members coacting to displace said valve according to the direction in which the wheel is rotated.

3. A ship's rudder carrier including rudder-turning means, a pump, conduits for the passage of liquid between the carrier and pump, a manually rotatable wheel connected to the pump for operation thereof, a valve arranged in said conduits and displaceable to direct liquid from the pump to the carrier in order to turn the rudder-turning means in a desired direction, an operative connection between said wheel and said valve to displace the latter according to the direction in which the wheel is rotated, said operative connection comprising a first element connected to and rotatable by the wheel and a second element connected to the valve and adapted to displace the valve, an operative component incorporated in said first element, a complementary component incorporated in said second element, said two components being adapted to interengage in the rotation of said wheel and to eventually disengage by continuation of such rotation, and means for re-engaging said components on reversal of the rotation of the wheel.

4. The combination claimed in claim 3 in which the operative connection between the wheel and the valve comprises a shaft turnable by the wheel, a screw-thread constituting the operative component of the first element, said screw-thread being on said shaft, a nut constituting the operative component of the second element, said nut embracing said shaft and being movable along it into and out of engagement with the screw-thread, and an operative connection between the nut and the valve.

5. The combination claimed in claim 3 in which the means for re-engaging the stated components of the two elements comprise springs arranged at opposite sides of the complementary component and alternatively stressable thereby in order to urge said component towards the other component.

6. For combination with a ship's rudder carrier including rudder-turning means and having conduits for the passage of liquid to and from the carrier; a pedestal, a pump mounted in said pedestal, a manually rotatable wheel journalled on said pedestal to operate the pump, a suction inlet and a discharge outlet on said pump, a valve arranged in the pedestal, passages for liquid between the inlet and outlet respectively and said valve, means on said pedestal for attachment to said conduits to bring them into communication under the control of said valve with said passages, and an operative connection between said wheel and said valve to displace the latter according to the direction in which the wheel is rotated, said operative connection comprising a first element connected to and rotatable by the wheel and a second element connected to the valve and adapted to displace the valve, an operative component incorporated in said first element, a complementary component incorporated in said second element, said two components being adapted to interengage in the rotation of said wheel and to eventually disengage by continuation of such rotation, and means for re-engaging said components on reversal of the rotation of the wheel.

7. A pedestal, a pump, a wheel and a valve, all as defined in claim 6, in which the operative connection between the wheel and the valve comprises a shaft turnable by the wheel, a screw-thread constituting the operative component of the first element, said screw-thread being on said shaft, a nut constituting the operative component of the second element, said nut embracing said shaft and being movable along it into and out of engagement with the screw-thread, and an operative connection between the nut and the valve.

8. A pedestal, a pump, a wheel and a valve, all as defined in claim 6, in which the means for re-engaging the stated components of the two elements comprise springs arranged at opposite sides of the complementary component and alternatively stressable thereby in order to urge said component towards the other component.

9. For combination with a ship's rudder carrier including rudder-turning means and having conduits for the passage of liquid to and from the carrier; a pump, a manually rotatable wheel operatively connected to the pump, passages leading to and from the pump and connectible to said conduits, a displaceable valve in said passages for directing liquid to and from said conduits in order to turn the rudder-turning means in a desired direction, an element connected to said rotatable wheel for rotation thereby, an axially displaceable element connected to said valve, said elements being adapted to engage and disengage each other, and means for bringing said elements into inter-engagement, said elements co-acting to displace said valve according to the direction in which the wheel is rotated.

10. A ship's rudder-carrying assembly comprising a liquid-container subdivided into compartments, a rudder stock passing into said container, rudder-turning rotatable means seated in said container to bear the down-thrust of said stock, means securing said rotatable means to said stock against relative axial and angular motion, a pump, conduits for the passage of liquid between said compartments and said pump, a manually rotatable wheel operatively connected to the pump, a displaceable valve in said conduits for directing liquid from the pump to said compartments in order to turn said rudder-turning rotatable means in a desired direction, a rotatable element connected to said rotatable wheel for rotation thereby, an axially displaceable element connected to said valve, said elements being adapted to engage and disengage each other, and means for bringing said elements into inter-engagement, said elements coacting to displace said valve according to the direction in which the wheel is rotated.

11. A ship's rudder-carrying assembly including a liquid-container and rudder-turning rotatable means in said container, a steering pedestal, a pump mounted on said pedestal and adapted to pump liquid unidirectionally, conduits for the passage of liquid in either of two directions between said container and said pump, a manually rotatable wheel journalled on said pedestal and operatively connected to the pump, a displaceable valve mounted on said pedestal and arranged in said conduits for directing unidirectionally pumped liquid in either of said directions to said container, means actuated by said wheel operatively connecting it to said valve, said wheel-actuated means including complementary components adapted to inter-engage and to eventually disengage, said components being adapted when inter-engaged to displace said valve in either of two directions, according to the direction in which the wheel is rotated, and when disengaged to maintain the valve fully displaced during continued rotation of the wheel, and means for re-engaging said components to return said valve on reversal of the direction of rotation of said wheel.

12. A ship's rudder-carrying assembly including a liquid-container and rudder-turning rotatable means in said container, a steering pedestal, a pump mounted on said pedestal and adapted for unidirectional suction and delivery of liquid, conduits for the passage of liquid in either of two directions between said container and said pump, said directions giving turning of the rudder to port and starboard respectively, a rotatable shaft journalled on said pedestal and operatively connected to the pump, a manually rotatable wheel for rotating said shaft, a valve mounted on said pedestal and arranged in said conduits for displacement between either of two positions in which said valve directs unidirectionally pumped liquid in either of said directions to said container, a manually rotatable screwed member carried by said rotatable shaft, and an axially displaceable screwed member connected to said valve, said screwed members inter-engaging and coacting to displace said valve towards either of said positions when the rotatable one of said members is rotated.

ROBERT MacGREGOR.